US009935699B2

(12) United States Patent
Kim et al.

(10) Patent No.: US 9,935,699 B2
(45) Date of Patent: Apr. 3, 2018

(54) COMMUNICATION METHOD AND APPARATUS USING BEAMFORMING IN A WIRELESS COMMUNICATION SYSTEM

(71) Applicant: Samsung Electronics Co., Ltd., Suwon-si, Gyeonggi-do (KR)

(72) Inventors: Tae-Young Kim, Seongnam-si (KR); Hyun-Kyu Yu, Yongin-si (KR); Ji-Yun Seol, Seongnam-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 116 days.

(21) Appl. No.: 13/923,846

(22) Filed: Jun. 21, 2013

(65) Prior Publication Data

US 2013/0343303 A1 Dec. 26, 2013

(30) Foreign Application Priority Data

Jun. 22, 2012 (KR) .................. 10-2012-0067197

(51) Int. Cl.
*H04B 7/04* (2017.01)
*H04B 7/06* (2006.01)
*H04B 7/0452* (2017.01)
*H04B 7/0456* (2017.01)

(52) U.S. Cl.
CPC ......... *H04B 7/0617* (2013.01); *H04B 7/0452* (2013.01); *H04B 7/0456* (2013.01); *H04B 7/0639* (2013.01); *H04B 7/0604* (2013.01)

(58) Field of Classification Search
CPC ................................ H04B 7/04; H04W 16/28
USPC .................................................. 370/329, 331
See application file for complete search history.

(56) References Cited

U.S. PATENT DOCUMENTS

| 8,274,937 | B2 * | 9/2012 | Tsai ..................... H04B 7/0408 370/329 |
| 8,374,109 | B2 * | 2/2013 | Luo ........................ H04L 5/0053 370/310 |
| 2005/0041750 | A1 | 2/2005 | Lau |
| 2008/0008110 | A1 | 1/2008 | Kishigami et al. |
| 2009/0318157 | A1 | 12/2009 | Hoshino et al. |

(Continued)

FOREIGN PATENT DOCUMENTS

| CN | 101272364 A | 9/2008 |
| CN | 101785210 A | 7/2010 |

(Continued)

*Primary Examiner* — Hassan Kizou
*Assistant Examiner* — Abdullahi Ahmed
(74) *Attorney, Agent, or Firm* — Jefferson IP Law, LLP (57) ABSTRACT

A communication method and an apparatus using beamforming in a wireless communication system are provided. The communication method includes determining a candidate user set including one or more Mobile Stations (MSs), for Multiple User-Multiple Input Multiple Output (MU-MIMO) transmission, transmitting beam information indicating best Base Station (BS) transmission beams of the MSs of the candidate user set to the MSs of the candidate user set, receiving Precoding Matrix Index (PMI) information indicating a PMI to be used for baseband precoding from each of the MSs of the candidate user set, the PMI information being determined based on the beam information, and transmitting a signal precoded based on the PMI information to at least one MS.

16 Claims, 7 Drawing Sheets

(56) References Cited

U.S. PATENT DOCUMENTS

| | | | |
|---|---|---|---|
| 2010/0080139 A1* | 4/2010 | Palanki et al. | 370/252 |
| 2010/0322176 A1* | 12/2010 | Chen | H04B 7/024 370/329 |
| 2011/0032839 A1* | 2/2011 | Chen | H04B 7/024 370/252 |
| 2011/0116437 A1* | 5/2011 | Chen et al. | 370/312 |
| 2011/0149765 A1* | 6/2011 | Gorokhov | H04L 1/0026 370/252 |
| 2011/0176633 A1 | 7/2011 | Ojard et al. | |
| 2011/0188599 A1 | 8/2011 | Kang et al. | |
| 2011/0222627 A1 | 9/2011 | Prakash et al. | |
| 2011/0249642 A1* | 10/2011 | Song et al. | 370/329 |
| 2012/0106346 A1* | 5/2012 | Aguirre et al. | 370/237 |
| 2012/0113794 A1* | 5/2012 | Roman | H04B 7/0452 370/201 |
| 2012/0213169 A1* | 8/2012 | Wang | H04B 7/04 370/329 |
| 2013/0022021 A1* | 1/2013 | Wild | H04B 7/0639 370/330 |
| 2013/0308488 A1* | 11/2013 | Tong | H04B 7/0452 370/252 |
| 2014/0293820 A1* | 10/2014 | Kim et al. | 370/252 |
| 2014/0307669 A1* | 10/2014 | Yang et al. | 370/329 |
| 2015/0036621 A1* | 2/2015 | Shin | H04J 11/0036 370/329 |

FOREIGN PATENT DOCUMENTS

| | | |
|---|---|---|
| JP | 2009-212560 A | 9/2009 |
| KR | 10-2011-0090645 A | 8/2011 |
| KR | 10-2012-0034973 A | 4/2012 |
| WO | 2009/023532 A2 | 2/2009 |
| WO | 2010/024589 A2 | 3/2010 |

* cited by examiner

COMMUNICATION METHOD AND APPARATUS USING BEAMFORMING IN A WIRELESS COMMUNICATION SYSTEM

PRIORITY

This application claims the benefit under 35 U.S.C. § 119(a) of a Korean patent application filed on Jun. 22, 2012 in the Korean Intellectual Property Office and assigned Serial No. 10-2012-0067197, the entire disclosure of which is hereby incorporated by reference.

BACKGROUND OF THE INVENTION

1. Field of the Invention

The present invention relates to information transmission and reception in a communication system. More particularly, the present invention relates to a method and apparatus of measuring channels and transmitting a feedback regarding multiple beams formed for multiple users in a wireless communication system.

2. Description of the Related Art

To satisfy ever-increasing demands for wireless data traffic, wireless communication systems have been developed toward higher data rates. Previously, efforts were expended on increasing spectral efficiency in order to increase data rates. However, as demands for traffic have been accelerated due to increased demands for smartphones and tablet Personal Computers (PCs) and the resulting rapid growth of application programs requiring a large amount of traffic, satisfying the soaring demands for wireless data traffic simply by increasing spectral efficiency is difficult.

One approach to averting the problem associated with the soaring demands for wireless data traffic is to use a very broad frequency band. Because securing a broad frequency band in the frequency band below 5 GHz used for legacy cellular mobile communication systems is difficult, the broadband frequency should be obtained from a higher frequency band. However, as wireless communication is conducted in a higher transmission frequency, propagation path loss is increased. The resulting shortened propagation distance reduces service coverage. One technique to mitigate path loss and increase the propagation distance of waves is beamforming.

Transmission beamforming is a scheme that focuses signals transmitted from a plurality of antennas toward a specific direction (e.g., space). A set of plural antennas is called an array antenna and each antenna included in the array antenna is called an antenna element. Because of the advantages associated with an increased propagation distance and almost non-transmission of a signal in directions other than a specific direction, the transmission beamforming reduces interference with other users significantly.

Reception beamforming is available on the part of a receiver using a reception array antenna. The reception beamforming focuses wave reception toward a specific direction, thereby increasing the reception sensitivity of a signal from the specific direction and excluding signals from other directions. Therefore, interference signals are blocked.

The wavelength of a signal wave gets shorter in a higher transmission frequency. If antennas are configured at half-wavelength intervals, more antennas may be arranged in the same area in an array antenna. Beamforming is favorable to a high-frequency communication system because high-frequency beamforming can produce a higher antenna gain than low-frequency beamforming.

Therefore, a need exists for a method and apparatus of transmitting and receiving information in a communication system. For example, a need exists for a hybrid beamforming structure by combining analog beamforming with digital beamforming in order to achieve a high antenna gain.

The above information is presented as background information only to assist with an understanding of the present disclosure. No determination has been made, and no assertion is made, as to whether any of the above might be applicable as prior art with regard to the present invention.

SUMMARY OF THE INVENTION

Aspects of the present invention are to address at least the above-mentioned problems and/or disadvantages and to provide at least the advantages described below. Accordingly, an aspect of the present invention is to provide a method and apparatus of transmitting and receiving information in a communication system.

Another aspect of the present invention is to provide a hybrid beamforming structure by combining analog beamforming with digital beamforming in order to achieve a high antenna gain.

Another aspect of the present invention is to provide a method and apparatus of appropriately selecting a precoding matrix for a precoder in forming one or more analog beams for analog beamforming.

In accordance with an aspect of the present invention, a communication method using beamforming in a wireless communication system is provided. The communication method includes determining a candidate user set including one or more Mobile Stations (MSs), for Multiple User-Multiple Input Multiple Output (MU-MIMO) transmission, transmitting beam information indicating best Base Station (BS) transmission beams of the MSs of the candidate user set to the MSs of the candidate user set, receiving Precoding Matrix Index (PMI) information indicating a PMI to be used for baseband precoding from each of the MSs of the candidate user set, the PMI information being determined based on the beam information, and transmitting a signal precoded based on the PMI information to at least one MS.

In accordance with another aspect of the present invention, a communication method using beamforming in a wireless communication system is provided. The communication method includes receiving, from a BS, beam information indicating best BS transmission beams of one or more MSs of a candidate user set including the one or more MSs for MU-MIMO transmission determining, by the MS, a PMI to be used for baseband precoding, referring to the best BS transmission beam of the other at least one MS of the candidate user set, indicated by the beam information, and transmitting, by the MS, PMI information indicating the determined PMI to the BS.

In accordance with another aspect of the present invention, a BS apparatus of performing communication using beamforming in a wireless communication system is provided. The BS apparatus includes a controller configured to determine a candidate user set including one or more MSs, for MU-MIMO transmission, a transmitter configured to transmit beam information indicating best BS transmission beams of the MSs of the candidate user set to the MSs of the candidate user set, and a receiver configured to receive PMI information indicating a PMI to be used for baseband precoding from each of the MSs of the candidate user set, the PMI information being determined based on the beam information.

In accordance with another aspect of the present invention, an MS apparatus of performing communication using beamforming in a wireless communication system is provided. The MS apparatus includes a receiver configured to receive, from a BS, beam information indicating best BS transmission beams of one or more MSs of a candidate user set including the one or more MSs for MU-MIMO transmission, a controller configured to determine a PMI to be used for baseband precoding, referring to the best BS transmission beam of the other at least one MS of the candidate user set, indicated by the beam information, and a transmitter configured to transmit PMI information indicating the determined PMI to the BS.

In accordance with another aspect of the present invention, a communication method using beamforming in a wireless communication system is provided. The communication method includes receiving PMI information from each of MSs within a cell, the PMI information indicating PMIs for a predetermined number of beam combinations produced out of a predetermined number of transmission beams selected by the MS, determining a user set including one or more MSs based on the PMI information, for MU-MIMO transmission, allocating the same resources to the MSs of the user set, and transmitting a signal precoded based on at least one of the PMIs to the MSs of the user set.

In accordance with another aspect of the present invention, a communication method using beamforming in a wireless communication system is provided. The communication method includes determining, by a MS, PMIs for a predetermined number of beam combinations produced out of a predetermined number of transmission beams selected based on a measurement of a reference signal received from a BS, transmitting, by the MS, PMI information indicating the PMIs to the BS, and receiving, by the MS, a signal precoded based on at least one of the PMIs from the BS.

In accordance with another aspect of the present invention, a BS apparatus of performing communication using beamforming in a wireless communication system is provided. The BS apparatus includes a receiver configured to receive PMI information from each MS within a cell, the PMI information indicating PMIs for a predetermined number of beam combinations produced out of a predetermined number of transmission beams selected by a corresponding MS, a controller configured to determine a user set including one or more MSs based on the PMI information, for MU-MIMO transmission, and a transmitter configured to allocate the same resources to MSs of a user set corresponding to MSs within the cell, and to transmit a signal precoded based on at least one of the PMIs to the MSs of the user set.

In accordance with another aspect of the present invention, an MS apparatus of performing communication using beamforming in a wireless communication system is provided. The MS apparatus includes a controller configured to determine PMIs for a predetermined number of beam combinations produced out of a predetermined number of transmission beams selected based on a measurement of a reference signal received from a BS, a transmitter configured to transmit, to the BS, PMI information indicating the PMIs, and a receiver configured to receive, from the BS, a signal precoded based on at least one of the PMIs.

Other aspects, advantages, and salient features of the invention will become apparent to those skilled in the art from the following detailed description, which, taken in conjunction with the annexed drawings, discloses exemplary embodiments of the invention.

BRIEF DESCRIPTION OF THE DRAWINGS

The above and other aspects, features, and advantages of certain exemplary embodiments of the present invention will be more apparent from the following description taken in conjunction with the accompanying drawings, in which.

Throughout the drawings, like reference numerals will be understood to refer to like parts, components, and structures.

DETAILED DESCRIPTION OF EXEMPLARY EMBODIMENTS

The following description with reference to the accompanying drawings is provided to assist in a comprehensive understanding of exemplary embodiments of the invention as defined by the claims and their equivalents. It includes various specific details to assist in that understanding but these are to be regarded as merely exemplary. Accordingly, those of ordinary skill in the art will recognize that various changes and modifications of the embodiments described herein can be made without departing from the scope and spirit of the invention. In addition, descriptions of well-known functions and constructions may be omitted for clarity and conciseness.

The terms and words used in the following description and claims are not limited to the bibliographical meanings, but, are merely used by the inventor to enable a clear and consistent understanding of the invention. Accordingly, it should be apparent to those skilled in the art that the following description of exemplary embodiments of the present invention is provided for illustration purpose only and not for the purpose of limiting the invention as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

The term "substantially" may be used to convey that the recited characteristic, parameter, or value need not be achieved exactly, but that deviations or variations, including for example, tolerances, measurement error, measurement accuracy limitations and other factors known to those of skill in the art, may occur in amounts that do not preclude the effect the characteristic was intended to provide.

Exemplary embodiments of the present invention will be provided to achieve the above-described technical aspects of the present invention. In an exemplary implementation, defined entities may have the same names, to which the present invention is not limited. Thus, exemplary embodiments of the present invention can be implemented with same or ready modifications in a system having a similar technical background.

Spatial Division Multiple Access (SDMA) is adopted to support multiple users simultaneously using beamforming in a millimeter Wave (mmWave) frequency band. Because of a short wavelength in the mmWave frequency band, beamforming can be performed through more antennas in the same area. When beamforming is performed using many antennas, signals are transmitted in beams with a narrow beamwidth. Therefore, in the case of beamforming with a narrow beamwidth, SDMA can be implemented, in which data is transmitted in the same resources simultaneously to multiple users at different spatial locations by Multiple Input Multiple Output (MIMO).

Downlink beamforming is performed using a pair of a transmission beam of a Base Station (BS) and a reception beam of a Mobile Station (MS). The downlink beamforming involves a process of selecting a best beam pair from among one or more BS transmission beams and MS reception beams steered in different directions according to the configurations of the BS and the MS and sharing information about the best beam pair between the BS and the MS. Likewise, uplink beamforming is performed using a pair of an MS transmission beam and a BS reception beam. For the uplink beamforming, information about a best beam pair selected from among one or more MS transmission beams and BS reception beams steered in different directions according to the configurations of the BS and the MS is shared between the BS and the MS.

Figure 1:
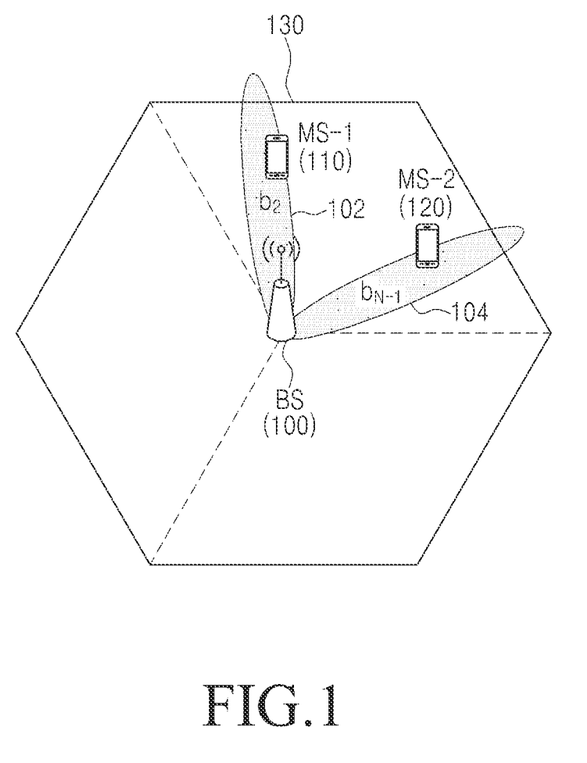
FIG. 1 illustrates a scenario of transmitting and receiving a signal by beamforming according to an exemplary embodiment of the present invention.

FIG. 1 illustrates a scenario of transmitting and receiving a signal by beamforming according to an exemplary embodiment of the present invention.

Referring to FIG. 1, a BS 100 covers a service area corresponding to a cell 130 including one or more sectors. The cell 130 may include one or more sectors and multiple beams may be used in each sector. Two users corresponding to first MS 110 and second MS 120 (e.g., respectively MS-1 and MS-2) are at different spatial locations within the cell 130. If users can be spatially distinguished from each other and thus different beams can be allocated to the users, the BS 100 transmits data allocated to the two MSs 110 and 120 in the same resources. The data allocated to the different MSs 110 and 120 are transmitted in different beams by beamforming. Specifically, beam 102 corresponding to $b_2$ and beam 104 corresponding to $b_{N-1}$ are allocated respectively to MS-1 and MS-2.

As less interference occurs between the simultaneous different beams, $b_2$ and $b_{N-1}$, beamforming ensures higher reliability and performance. However, side lobe effects cannot be ignored in an actual beam pattern and simultaneous beams closer to each other increase interference. Consequently, beamforming performance is not ensured.

To avert such problems associated with beamforming, a digital precoder-based MU-MIMO scheme is applied to an analog beamforming system.

Figure 2:
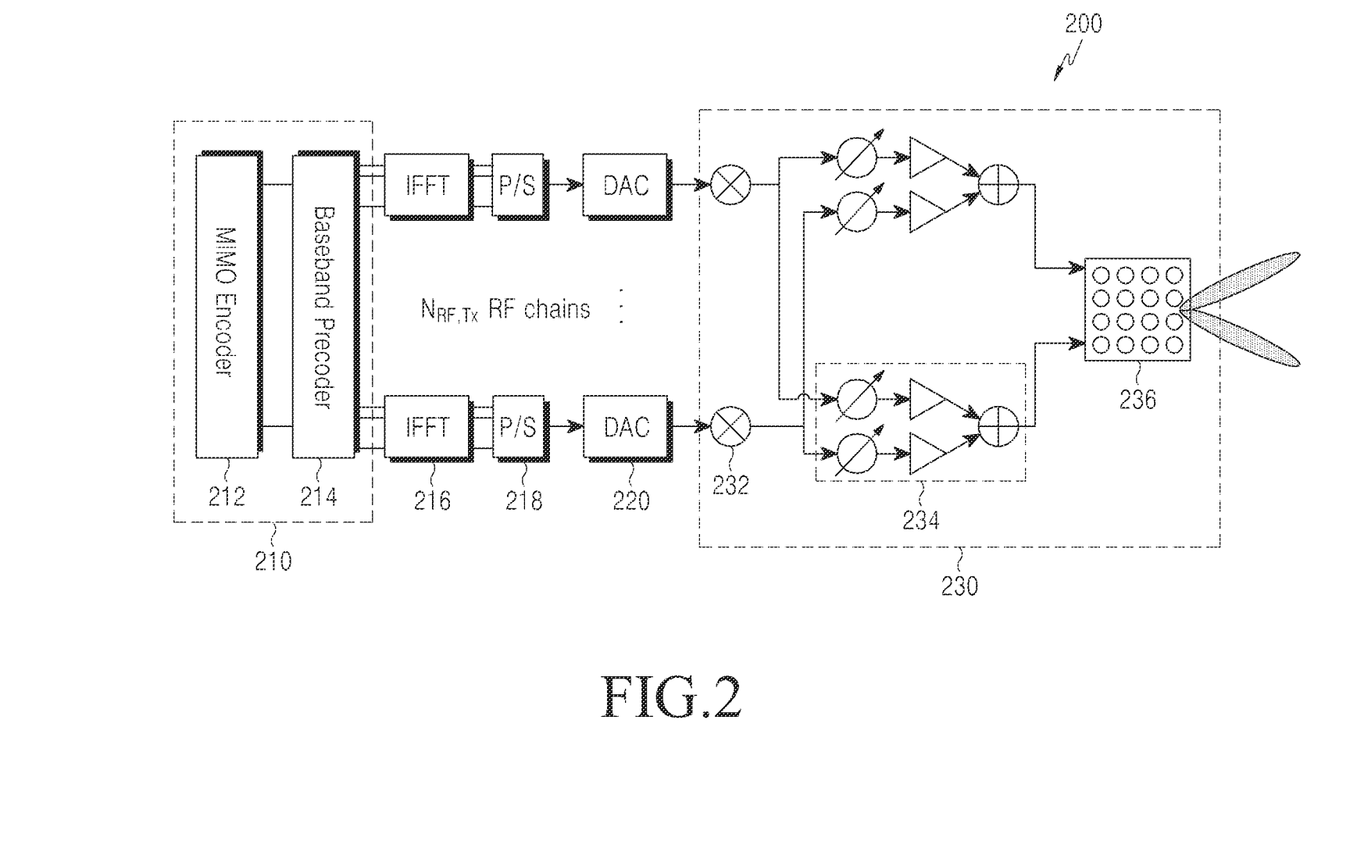
FIG. 2 is a block diagram of a transmitter in a millimeter-wave wireless communication system according to an exemplary embodiment of the present invention.

FIG. 2 is a block diagram of a transmitter in an mmWave wireless communication system according to an exemplary embodiment of the present invention.

Referring to FIG. 2, a Radio Frequency (RF) beamformer (or analog beamformer) 230 of a transmitter 200 includes an array antenna 236 with a plurality of antenna elements in order to overcome wave path loss of a radio channel in an mmWave frequency band. The RF beamformer 230 upconverts baseband signals received through a plurality of RF chains to RF signals by means of a plurality of frequency converters 232.

The RF beamformer 230 performs analog beamforming using a combination 234 of a plurality of phase shifters, a plurality of power amplifiers, and a plurality of adders, which are mapped to the plurality of antenna elements. When transmitting the same signal through the plurality of antenna elements of the array antenna 236, the transmitter 200 may shift the phase of a signal for each antenna element according to an intended direction and the position of the antenna element and may amplify the phase-shifted signal through a power amplifier, thereby steering each beam in an intended direction. The phase shift values and power amplification values of the beams may vary depending on channel states between the transmitter 200 and receivers. A plurality of phase shifters may be connected to each antenna element in order to apply different phases to RF signals received through the plurality of RF chains.

The RF beamformer 230 may be connected to one or more RF chains, (e.g., $N_{RF,\,TX}$) chains according to the capabilities of the transmitter 200. Each RF chain transmits a precoded signal to a frequency converter 232 of the RF beamformer 230 through an Inverse Fast Fourier Transform (IFFT) processor 216, a Parallel-to-Serial (P/S) converter 218, and a Digital-to-Analog Converter (DAC) 220. The frequency converter 232 may be regarded as a component of the RF chain, not as a component of the RF beamformer 230.

A MIMO encoder 212 and a baseband precoder 214 may collectively form a digital beamformer 210 that receives one or more encoded and modulated signals and that performs baseband beamforming on the received signals, taking into beamforming of the array antenna 236. The MIMO encoder 212 converts a plurality of streams for one or more users to a predetermined number of MIMO streams, and the baseband precoder 214 generates a plurality of precoded signals corresponding to the RF chains by applying a predetermined precoding matrix to the MIMO streams. The precoded signals are provided to the RF beamformer 230 through the RF chains.

A precoding matrix that minimizes interference between different receivers (e.g., users or MSs) according to channel states between the transmitter 200 and the receivers is selected for application to the baseband precoder 214. Specifically, the baseband precoder 214 preserves a codebook of precoding matrices preset between the transmitter and the receivers and indicates or identifies a precoding matrix to be applied to streams by a Precoding Matrix Indicator or Index (PMI) indicating one of the precoding matrices according to the channel states.

Figure 3:
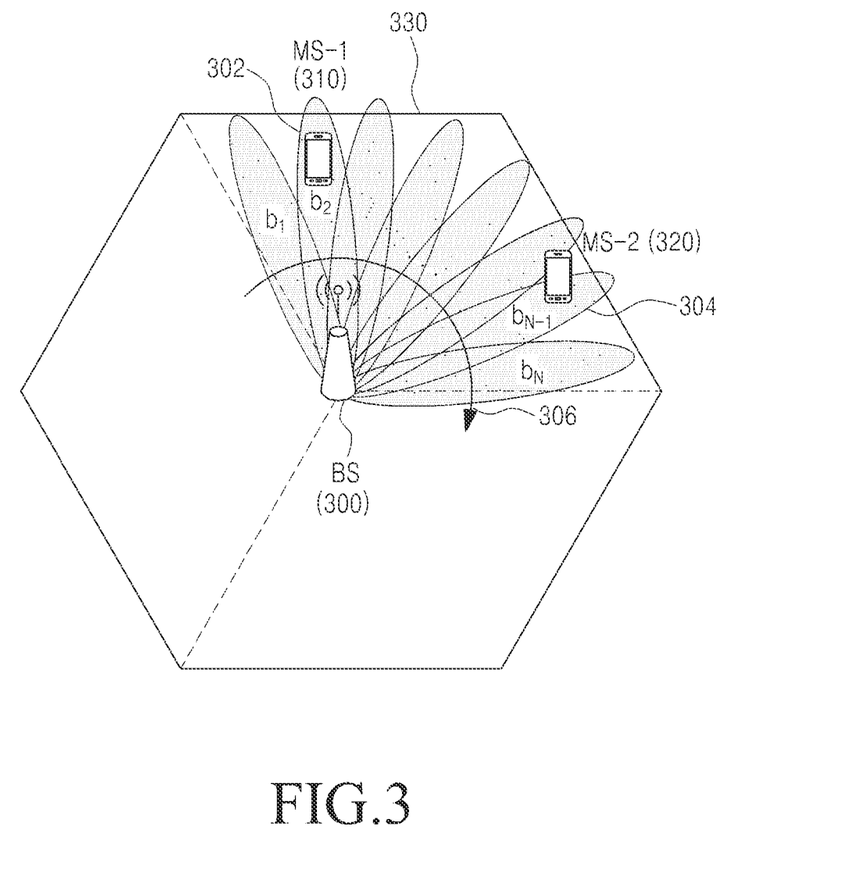
FIG. 3 illustrates beam acquisition and channel measurement of each beam according to an exemplary embodiment of the present invention.

FIG. 3 illustrates beam acquisition and channel measurement of each beam according to an exemplary embodiment of the present invention.

Referring to FIG. 3, all MSs within a service area 330 of a BS 300 acquire information about transmission and reception beams to conduct communication. For this purpose, the BS 300 repeatedly forms omni-directional beams in each sector (e.g., as indicated by reference numeral 306), and transmits a Reference Signal (RS) in each beam. As an example, the RS may be a digital bit sequence of a preset format. RSs may be divided into an RS for channel state measurement and an RS for beamforming according to the respective RS usages, or the RSs may be used commonly for channel state measurement and beamforming. Specifically, the BS 300 sequentially transmits different beams $b_1$ to $b_N$ and every MS within the BS 300 measures the channel state (e.g., received signal strength) of each beam and selects a transmission beam in the best channel state, namely a best transmission beam.

When the BS 300 repeatedly transmits RSs in all beams, first MS 310 and second MS 320 (e.g., respectively corresponding to MS-1 and MS-2) select transmission beams having the largest signal strengths or the largest Signal-to-Noise Ratios (SNRs) as best transmission beams. Specifically, MS-1 selects a beam 302 corresponding to $b_2$ as the best transmission beam and MS-2 selects a beam 304 corresponding to $b_{N-1}$ as the best transmission beam.

Figure 4:
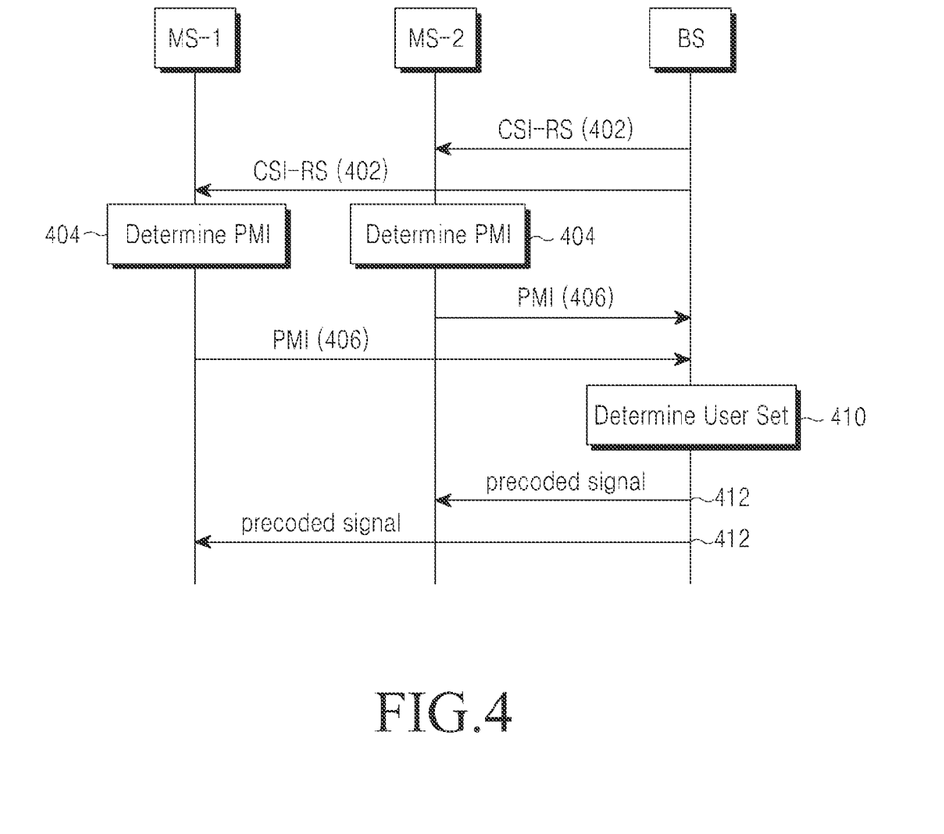
FIG. 4 is a diagram illustrating a signal flow for a Multiple User-Multiple Input Multiple Output (MU-MIMO) transmission procedure using precoding according to an exemplary embodiment of the present invention.

FIG. 4 is a diagram illustrating a signal flow for a Multiple User-Multiple Input Multiple Output (MU-MIMO) transmission procedure using precoding according to an exemplary embodiment of the present invention.

Referring to FIG. 4, in step 402, a BS transmits RSs such as Channel State Information-Reference Signals (CSI-RSs) to all MSs within a cell (or sector). The RSs may be RSs used for CSI measurement or Common RSs (CRSs).

In step 404, first MS and second MS (respectively corresponding to MS-1 and MS-2) receive the RSs, measure CSI based on the received RSs, and determine PMIs best matching to the respective channel states based on the measurements as corresponding to best PMIs. As an example, in a PMI calculation algorithm, the throughputs of all precoding matrices included in a codebook may be calculated using a CSI measurement, and a PMI indicating a precoding matrix having the highest efficiency may be determined to correspond to the best PMI. A more simplified algorithm is also available for PMI calculation.

In step 406, MS-1 and MS-2 respectively report information about the determined best PMIs to the BS on a preset uplink feedback channel or by a preset uplink message. Additionally, MS-1 and MS-2 may report the CSI measurements of the RSs and the PMI information together or separately to the BS.

In step 410, the BS selects a user set for MU-MIMO transmission based on the reports of the PMIs and/or channel measurements received from MS-1 and MS-2. The user set may include two or more MSs that may increase the overall system capacity of the BS. For example, the BS may calculate a communication throughput over every possible user set produced from all MSs within the cell (or sector) and may select a user set having the highest throughput. According to an exemplary embodiment of the present invention, a more simplified user set selection algorithm may be used. It is assumed that the BS selects MS-1 and MS-2 as the user set.

In step 412, the BS allocates the same resources (e.g., the same time-frequency, code, and the like) to MS-1 and MS-2 to support MU-MIMO, and transmits signals precoded based on the reported PMI information in the allocated resources to MS-1 and MS-2.

As described before, precoding is preferably performed in such a manner that interference is minimized between simultaneously transmitted signals. If analog beamforming is not used, each MS may determine a PMI based only on the channel measurement performed in step 404. In contrast, in a communication system using multiple beams by analog beamforming, an MS needs information about a user set to which signals are transmitted in the same resources, (e.g., information about the directions of transmission beams applied to the other MSs (i.e., users) of the user set) in order to support MU-MIMO. If the MS does not have knowledge of the beam information, the MS may not calculate or select a PMI matching to channels formed by multiple transmission beams. Accordingly, the MS preferably determines a PMI, taking into account the directions of transmission beams applied to the other MSs that receive signals simultaneously with the MS.

Figure 5:
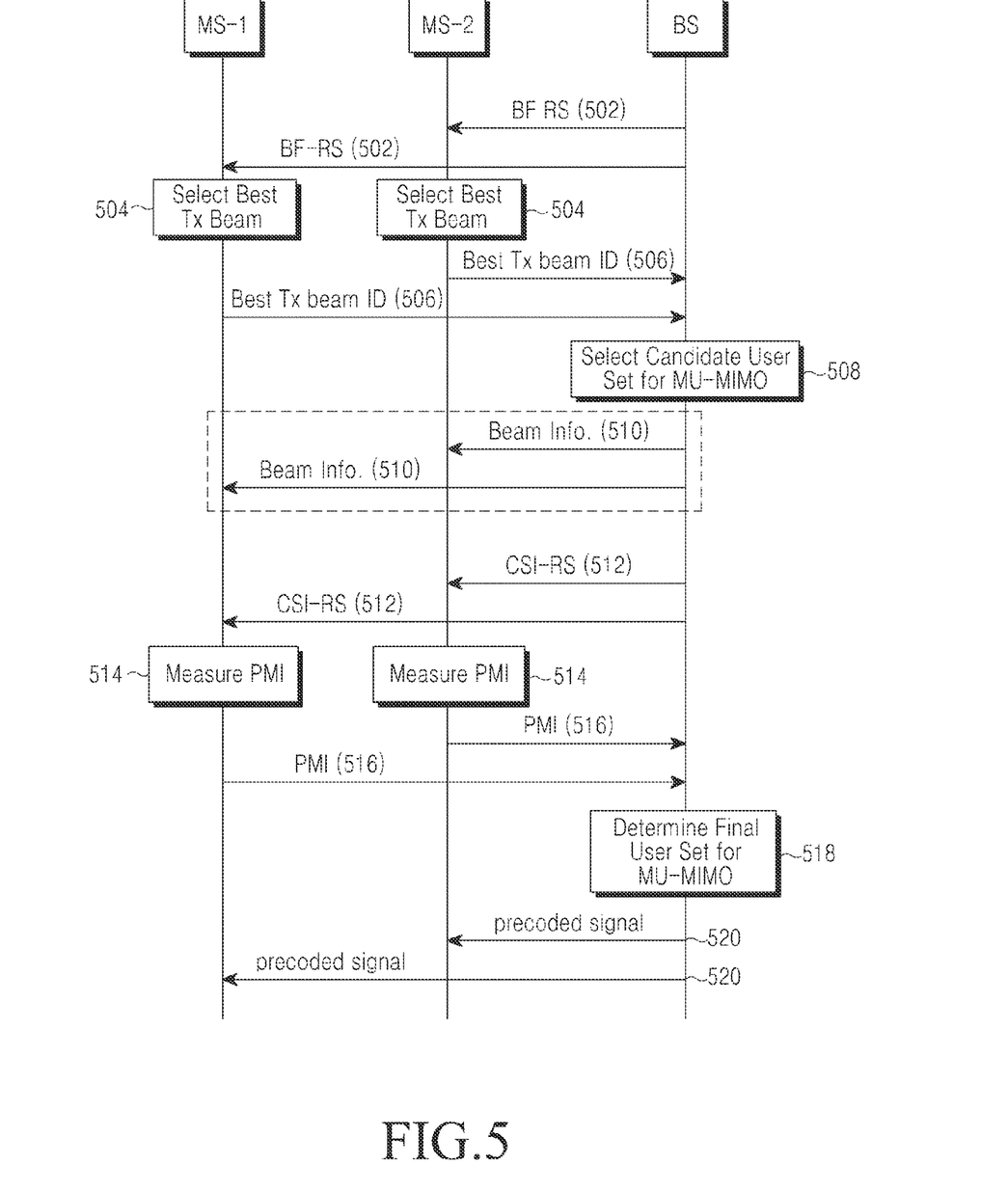
FIG. 5 is a diagram illustrating a signal flow for an MU-MIMO transmission procedure using analog beamforming and precoding according to an exemplary embodiment of the present invention.

For this purpose, the BS directly transmits information about the best BS transmission beams of the other MS(s) selected for MU-MIMO to the MS in an exemplary embodiment of the present invention illustrated in FIG. 5. Because each MS of a selected user set directly shares information about beams used for the other MS(s) of the user set, the MS may calculate and select a PMI.

FIG. 5 is a diagram illustrating a signal flow for an MU-MIMO transmission procedure using analog beamforming and precoding according to an exemplary embodiment of the present invention.

Referring to FIG. 5, in step 502, a BS continuously transmits RSs such as BeamForming RSs (BF-RSs) to all MSs within a cell (or sector). The RSs are repeatedly transmitted in all transmission beams of the BS so that each of the MSs may measure the signal strengths of all possible combinations produced out of the BS transmission beams and the reception beams of the MS. The RSs may be configured for beamforming only, for beamforming and channel state measurement, or for common usages. Each MS receives each transmission beam of the BS using all reception beams of the MS and measures the signal strength of each received beam.

In step 504, first MS and second MS (respectively corresponding to MS-1 and MS-2) select best BS transmission beams and best MS reception beams that have highest signal strengths according to measurements of the MSs.

In step 506, MS-1 and MS-2 report information about the best BS transmission beams to the BS on an uplink feedback channel or by an uplink message.

In step 508, the BS selects a candidate user set needed for an MU-MIMO operation based on information about best BS transmission beams received from a plurality of MSs. For example, the BS may select MSs having transmission beams transmitted in the same or similar directions as a candidate user set. In this case, system capacity may be increased by minimizing interference between transmission beams in MU-MIMO. Herein, it is assumed that MS-1 and MS-2 are selected as a candidate user set. The term 'candidate' is used to distinguish the user pair from a final user pair determined based on PMIs reported by MSs, for an actual MU-MIMO operation in step 518.

In step 510, the BS signals beam information indicating the best BS transmission beam of the other MS of the candidate user set to each of MS-1 and MS-2. For example, the beam information may include a beam index indicating the best BS transmission beam of the other at least one MS. For example, beam information indicating the best BS transmission beam reported by MS-2 in step 506 is transmitted to MS-1, whereas beam information indicating the best BS transmission beam reported by MS-1 in step 506 is transmitted to MS-2. According to exemplary embodiments of the present invention, the BS transmits beam information indicating the best BS transmission beams of MS-1 and MS-2 along with Identifiers (IDs) of MS-1 and MS-2 to both MS-1 and MS-2.

In step 512, the BS continuously transmits RSs such as CSI-RSs to all MSs within the cell (or sector). The CSI-RSs are used for each of the MSs to measure the signal strengths of channels between the BS and the MS. The RSs may be configured for channel state measurement, for beamforming and channel state measurement, or for common usages. Each MS receives an RS from the BS and measures a channel state (e.g., a received signal strength) between the BS and the MS.

In step 514, each of the MSs of the candidate user set (e.g., MS-1 and MS-2) determines a best PMI matching to the channel state and BS transmission beam of the MS based on CSI resulting from measuring the RS, the BS transmission beams of the MS, and the BS transmission beam of the other MS acquired in step 510. As an example, in a PMI calculation algorithm, the MS may select, as the best PMI, the PMI of a precoding matrix having the highest similarity or correlation with channels established by the BS transmission beams of the MS and the other MS from among all precoding vectors included in a codebook. In other words, a precoding vector having the highest correlation with effective channels may have the highest throughput. A more simplified PMI calculation algorithm is also available.

In step 516, MS-1 and MS-2 report information about the determined PMIs to the BS on a predetermined uplink feedback channel or by a predetermined uplink message. Additionally, MS-1 and MS-2 may transmit the PMI information and the channel measurement results of the RS (i.e. CSI) together or separately.

In step 518, the BS determines a final user set for MU-MIMO transmission based on the PMIs reported by MS-1 and MS-2 of the candidate user set. For example, if the BS determines, based on the PMIs reported by the candidate MSs, that simultaneous signal transmission to the MSs of the candidate user set increases system capacity, the BS selects the candidate user set as a final user set. In contrast, if simultaneous signal transmission to the MSs of the candidate user set does not increase system capacity, the BS may detect another user set or may determine at least one of the MSs included in the candidate user set as a final user set.

In step 520, the BS allocates the same resources (e.g., the same time-frequency, code, and the like) to the MSs of the user set selected as best (e.g., MS-1 and MS-2) for MU-MIMO, and transmits signals precoded based on the PMI information reported in step 516 in the allocated resources to MS-1 and MS-2. The precoded signals are transmitted to MS-1 and MS-2 in the BS transmission beams reported in step 506 by beamforming.

According to exemplary embodiments of the present invention, the BS may select a plurality of candidate user sets in step 507 and select one of the candidate user sets as a final user set for MU-MIMO based on PMIs reported by the MSs of each candidate user set in step 518.

Figure 6:
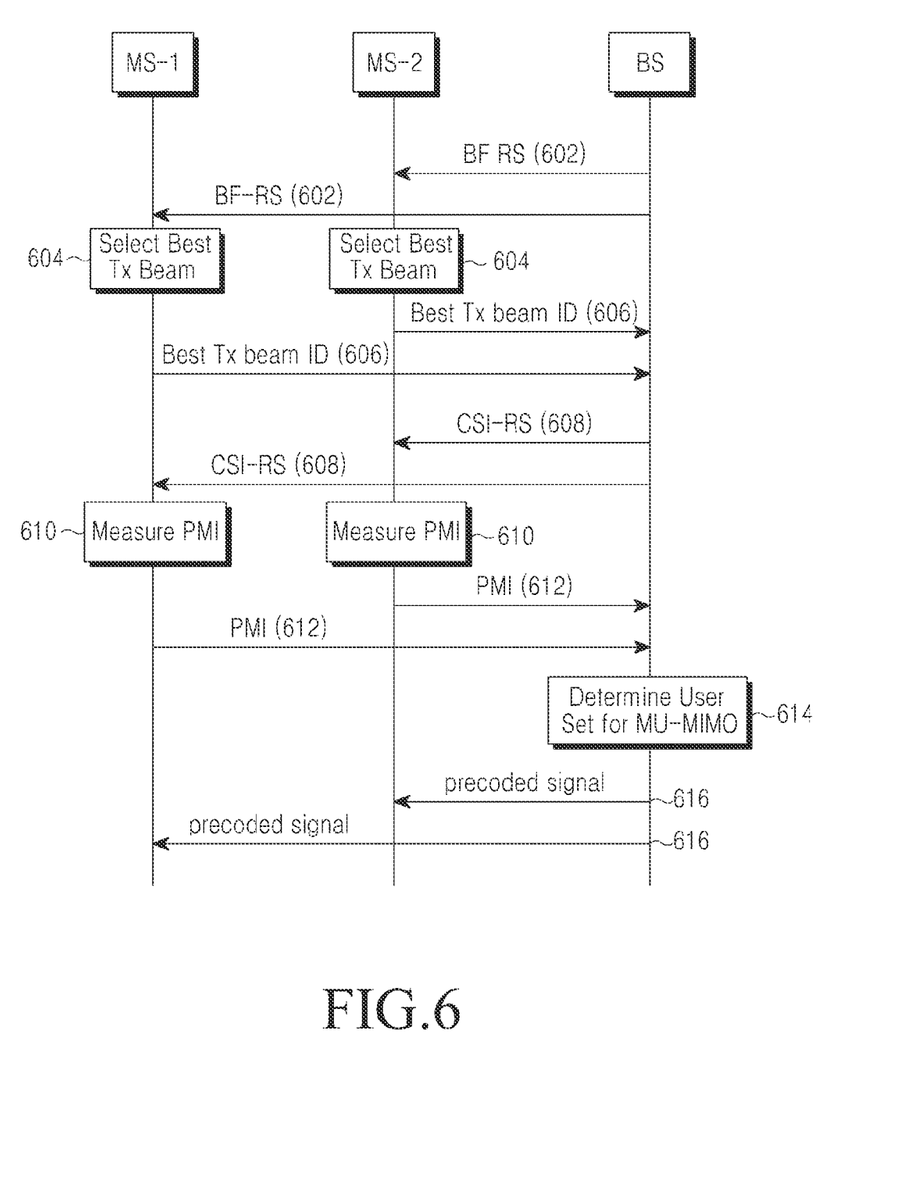
FIG. 6 is a diagram illustrating a signal flow for an MU-MIMO transmission procedure using analog beamforming and precoding according to an exemplary embodiment of the present invention.

According to exemplary embodiments of the present invention such as the exemplary embodiment illustrated in FIG. 6, each MS feeds back PMIs and Channel Quality Indications (CQIs) regarding transmission beam combinations, rather than the BS directly signaling a user set to MSs.

According to exemplary embodiments of the present invention, each MS may measure a plurality of PMIs and CQIs regarding combinations produced out of a best transmission beam selected by the MS and other adjacent transmission beams and may feed back the PMIs and CQIs to the BS.

According to exemplary embodiments of the present invention, each MS may measure a plurality of PMIs and CQIs regarding combinations produced out of a predetermined number of best transmission beams having good signal qualities selected based on measurements of RSs and may feed back the PMIs and CQIs to the BS.

FIG. 6 is a diagram illustrating a signal flow for an MU-MIMO transmission procedure using analog beamforming and precoding according to an exemplary embodiment of the present invention.

Referring to FIG. 6, although the following description is given with the appreciation that combinations produced out of a best transmission beam and other transmission beams adjacent to the best transmission beam are used, according to exemplary embodiments of the present invention, a plurality of best transmission beams having high received signal strengths are used.

In step 602, a BS continuously transmits RSs such as BF-RSs to all MSs within a cell (or sector). The RSs are repeatedly transmitted in all transmission beams of the BS so that each of the MSs may measure the signal strengths of all possible combinations produced out of the transmission beams of the BS and reception beams of the MS. The RSs may be configured for beamforming only, for beamforming and channel state measurement, or for common usages. Each MS receives each transmission beam of the BS using all reception beams of the MS and measures the signal strength of each received beam.

In step 604, first MS and second MS (respectively corresponding to MS-1 and MS-2) select best BS transmission beams and best MS reception beams that have highest signal strengths according to measurements of the MSs.

In step 606, MS-1 and MS-2 report information about the best BS transmission beams to the BS on an uplink feedback channel or by an uplink message. In this manner, the BS acquires information about the best transmission beams of the MSs within the cell.

In step 608, the BS continuously transmits RSs such as CSI-RSs to all MSs within the cell (or sector). The CSI-RSs are used for each of the MSs to measure the signal strengths of channels between the BS and the MS. The RSs may be configured for channel state measurement, for beamforming and channel state measurement, or for common usages. Each MS receives an RS from the BS and measures a channel state (i.e. received signal strength) between the BS and the MS.

In step 610, each of the MSs, MS-1 and MS-2 determines a plurality of PMIs best matching to the channel state and BS transmission beam of the MS based on CSI resulting from measuring the RS. Specifically, the MS selects a predetermined number of beam combinations produced out of the selected best transmission beam and its adjacent transmission beams and measure PMIs regarding the selected beam combinations. As an example, in a PMI calculation algorithm, the MS may calculate the throughput of every precoding matrix included in a codebook using the CSI and the BS transmission beams of a beam combination and may determine, as the best PMI, the PMI of a precoding matrix having a highest efficiency. A more simplified PMI calculation algorithm is also available.

In step 612, MS-1 and MS-2 report information about the determined PMIs to the BS on a predetermined uplink feedback channel or by a predetermined uplink message. The PMI information may further include the beam indexes of beam combinations. Additionally, MS-1 and MS-2 may transmit the PMI information and the channel measurement results of the RSs (e.g., CSI) together or separately.

In step 614, the BS selects a user set that increases system capacity most, for MU-MIMO transmission, based on the best transmission beam information and PMI information reported by the MSs within the cell.

In step 616, the BS allocates the same resources (e.g., the same time-frequency, code, and the like) to the MSs of the user set selected as best (e.g., MS-1 and MS-2) and transmits signals precoded based on one of the PMIs reported in step 612 to MS-1 and MS-2. Specifically, a PMI corresponding to the user set selected in step 614 may be used. The precoded signals may be transmitted to the MSs in the BS transmission beams reported in step 606.

Figure 7:
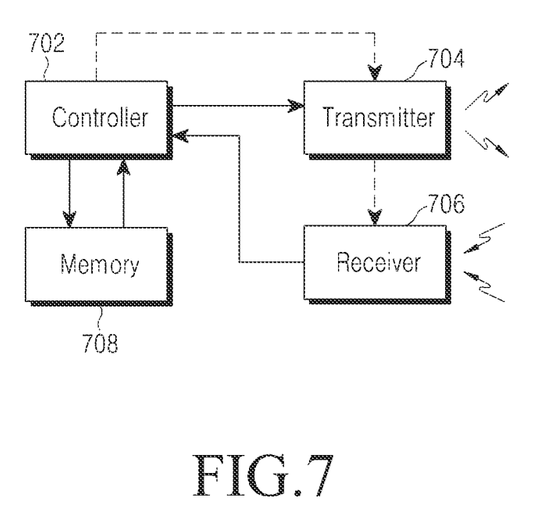
FIG. 7 is a block diagram of a Base Station (BS) and a Mobile Station (MS) according to an exemplary embodiment of the present invention.

FIG. 7 is a block diagram of a BS and an MS according to an exemplary embodiment of the present invention.

Referring to FIG. 7, a BS and an MS includes a controller 702, a transmitter 704, a receiver 706, and a memory 708.

According to the configuration of the MS illustrated in FIG. 7, the receiver 706 receives an RS in each MS reception beam by sweeping MS reception beams under the control of the controller 702, measures the RSs, and provides the measurements to the controller 702. The receiver 706 also receives beam information about a candidate user set selected by a BS from the BS and provides the beam information to the controller 702.

According to the configuration of the MS illustrated in FIG. 7, the transmitter 704 transmits information about a best transmission beam to the BS under the control of the controller 702. The transmitter 704 also transmits to the BS information about a PMI determined based on the best transmission beam and the BS transmission beams of the other MSs of the candidate user set or information about a plurality of PMIs regarding a plurality of beam combinations produced out of the best transmission beam and its adjacent beams, under the control of the controller 702.

According to the configuration of the MS illustrated in FIG. 7, the controller 702 controls operations of the transmitter 704 and the receiver 706. The controller 702 selects the best BS transmission beam, measures CSI, determines one or more PMIs, receives a precoded signal carrying MU-MIMO data through the receiver 706, and interprets the precoded signal.

According to the configuration of the MS illustrated in FIG. 7, the memory 708 stores an operation program code and parameters for the controller 702.

According to the configuration of the BS illustrated in FIG. 7, the transmitter 704 transmits RSs in BS transmission beams to MSs and transmits beam information about a candidate user set to the MSs of the candidate user set under the control of the controller 702.

According to the configuration of the BS illustrated in FIG. 7, the receiver 706 receives information about a best BS transmission beam and information about an MS-determined PMI(s) from each of the MSs under the control of the controller 702.

According to the configuration of the BS illustrated in FIG. 7, the controller 702 controls operations of the transmitter 704 and the receiver 706, determines the candidate user set, and selects a final user set for MU-MIMO transmission based on the PMIs reported by the MSs of the candidate user set. Alternatively, the controller 702 selects a user set for MU-MIMO transmission based on PMIs regarding a plurality of beam combinations, reported by the MSs. The controller 702 generates precoded signals carrying MU-MIMO data and transmits the precoded signals through the transmitter 704.

According to the configuration of the BS illustrated in FIG. 7, the memory 708 stores an operation program code and parameters for the controller 702.

Exemplary embodiments of the present disclosure as described above may involve the processing of input data and the generation of output data to some extent. The input data processing and the output data generation may be implemented in hardware or software in combination with hardware. For example, specific electronic components may be employed in a mobile device or similar or related circuitry for implementing the functions associated with the exemplary embodiments of the present invention as described above. Alternatively, one or more processors operating in accordance with stored instructions may implement the functions associated with the exemplary embodiments of the present invention as described above. If such is the case, it is within the scope of the present disclosure that such instructions may be stored on one or more non-transient processor readable mediums. Examples of the processor readable mediums include Read-Only Memory (ROM), Random-Access Memory (RAM), CD-ROMs, magnetic tapes, floppy disks, and optical data storage devices. The non-transient processor readable mediums can also be distributed over network coupled computer systems so that the instructions are stored and executed in a distributed fashion. Also, functional computer programs, instructions, and instruction segments for accomplishing exemplary embodiments of the present invention can be easily construed by programmers skilled in the art to which the present invention pertains.

While the invention has been shown and described with reference to certain exemplary embodiments thereof, it will be understood by those skilled in the art that various changes in form and details may be made therein without departing from the spirit and scope of the invention as defined by the appended claims and their equivalents.

What is claimed is:

1. A communication method using beamforming by a base station (BS) in a wireless communication system, the communication method comprising:
   determining a candidate user set including a plurality of mobile stations (MSs), for multiple user-multiple input multiple output (MU-MIMO) transmission;
   transmitting beam information on best BS transmission beams set to the plurality of MSs;
   receiving, by the BS, precoding matrix index (PMI) information indicating a PMI to be used for precoding from each of the plurality of MSs, the PMI information being determined based on the beam information;
   selecting at least two MSs from the plurality of MSs based on the best BS transmission beams of the plurality of MSs and the received PMI information;
   transmitting resource allocation information indicating same resources allocated to the at least two selected MSs; and
   transmitting precoded signals for the at least two selected MSs based on the PMI information on the allocated resources,
   wherein beam information transmitted to a first MS of the candidate user set indicates at least one best BS transmission beam reported by at least one MS other than the first MS from among the candidate user set.

2. The communication method of claim 1, wherein the determination of the candidate user set comprises:
   determining the candidate user set based on information about best BS transmission beams reported by a plurality of MSs within a cell.

3. The communication method of claim 1, further comprising:
   determining a user set including the at least two MSs for MU-MIMO transmission based on the PMI information.

4. The communication method of claim 1, wherein the candidate user set is determined to comprise the plurality of MSs having best BS transmission beams of the same or similar directions.

5. A communication method using beamforming by a mobile station (MS) in a wireless communication system, the communication method comprising:
- receiving, from a base station (BS), beam information on best BS transmission beams for a plurality of mobile stations (MSs) of a candidate user set including the plurality of MSs for multiple user-multiple input multiple output (MU-MIMO) transmission;
- determining a precoding matrix index (PMI) to be used for precoding, based on the best BS transmission beam of another at least one MS of the candidate user set, indicated by the beam information;
- transmitting PMI information indicating the determined PMI to the BS;
- receiving, from the BS, resource allocation information indicating same resources allocated to the MS and the other at least one MS selected by the BS, if the MS and the other at least one MS are selected from the plurality of MSs of the candidate user set based on the best BS transmission beams of the plurality of MSs received from the plurality of MSs and PMI information of the plurality of MSs; and
- receiving, from the BS, a precoded signal for the MS based on the PMI information on the allocated resources indicated by the resource allocation information,
- wherein the beam information transmitted to a first MS of the candidate user set indicates at least one best BS transmission beam reported by at least one MS other than the first MS from among the candidate user set.

6. The communication method of claim 5, wherein the candidate user set is determined based on information about best BS transmission beams of a plurality of MSs within a cell, reported to the BS.

7. The communication method of claim 5, wherein the candidate user set is determined to comprise the plurality of MSs having best BS transmission beams of the same or similar directions.

8. A Base Station (BS) apparatus for performing communication using beamforming in a wireless communication system, the BS apparatus comprising:
- at least one processor configured to determine a candidate user set including a plurality of mobile stations (MSs), for multiple user-multiple input multiple output (MU-MIMO) transmission;
- a transceiver configured to:
  - transmit beam information on best BS transmission beams set to the plurality of MSs, and
  - receive precoding matrix index (PMI) information indicating a PMI to be used for precoding from each of the plurality of MSs, the PMI information being determined based on the beam information,
- wherein the at least one processor is further configured to:
  - select at least two MSs from the plurality of MSs based on the best BS transmission beams of the plurality of MSs and the received PMI information, and
  - allocate the same resources to the at least two MSs selected from the candidate user set,
- wherein the transceiver is further configured to:
  - transmit resource allocation information indicating the resources allocated the at least two selected MSs, and
  - transmit precoded signals for the at least two selected MSs based on the PMI information on the allocated resources, and
- wherein beam information transmitted to a first MS of the candidate user set indicates at least one best BS transmission beam reported by at least one MS other than the first MS from among the candidate user set.

9. The BS apparatus of claim 8, wherein the at least one processor is further configured to determine the candidate user set based on information about best BS transmission beams reported by a plurality of MSs within a cell.

10. The BS apparatus of claim 8, wherein the at least one processor is further configured to determine a user set including the at least two MSs for MU-MIMO transmission based on the PMI information.

11. The BS apparatus of claim 8, wherein the candidate user set is determined to comprise the plurality of MSs having best BS transmission beams of the same or similar directions.

12. A mobile station (MS) apparatus for performing communication using beamforming in a wireless communication system, the MS apparatus comprising:
- a transceiver configured to receive, from a base station (BS), beam information on best BS transmission beams for a plurality of MSs of a candidate user set including the plurality of MSs for multiple user-multiple input multiple output (MU-MIMO) transmission; and
- at least one processor configured to determine a precoding matrix index (PMI) to be used for precoding, based on the best BS transmission beam of another at least one MS of the candidate user set, indicated by the beam information,
- wherein the transceiver is further configured to:
  - transmit PMI information indicating the determined PMI to the BS,
  - receive, from the BS, resource allocation information indicating same resources allocated to the MS and the other at least one MS selected by the BS, if the MS and the other at least one MS are selected from the plurality of MSs of the candidate user set based on the best BS transmission beams of the plurality of MSs received from the plurality of MSs and PMI information of the plurality of MSs, and
  - receive, from the BS, a precoded signal for the MS based on the PMI information on the allocated resources indicated by the resource allocation information, and
- wherein the beam information transmitted to a first MS of the candidate user set indicates at least one best BS transmission beam reported by at least one MS other than the first MS from among the candidate user set.

13. The MS apparatus of claim 12, wherein the candidate user set is determined based on information about best BS transmission beams of a plurality of MSs within a cell, reported to the BS.

14. The MS apparatus of claim 12, wherein the candidate user set is determined to comprise the plurality of MSs having best BS transmission beams of the same or similar directions.

15. A non-transitory computer-readable storage medium storing instructions that, when executed, cause at least one processor to perform the method of claim 1.

16. A non-transitory computer-readable storage medium storing instructions that, when executed, cause at least one processor to perform the method of claim 5.

* * * * *